March 20, 1956 O. J. POUPITCH 2,738,698

THREAD CUTTING SCREW

Filed May 8, 1952

INVENTOR.
Ougljesa Jules Poupitch
BY
Moore, Olson & Trexler
Attys.

United States Patent Office 2,738,698
Patented Mar. 20, 1956

1

2,738,698

THREAD CUTTING SCREW

Ougljesa Jules Poupitch, Chicago, Ill., assignor to Illinois Tool Works, Chicago, Ill., a corporation of Illinois Application May 8, 1952, Serial No. 286,750

4 Claims. (Cl. 85—47)

The present invention relates to thread cutting screws, and more particularly to thread cutting screws of the type wherein a recess is formed in the shank of the screw to provide a cutting edge.

Screws of the above described type are generally used for application to an unthreaded aperture in a work piece during which application the screw threads cut complementary threads in the work piece. In the past, difficulty has been encountered in initially starting the screw into the work piece and in effectively discharging the chips cut in the work piece, which chips tend to accumulate and jam the cutting edge of the screw. It is, therefore, an object of this invention to eliminate the above difficulties by providing an improved thread cutting screw, wherein the thread cutting edge is formed to provide positive feeding of the screw into the work piece and wherein the surfaces of the recess are formed efficiently to direct the chips away from the cutting edge.

A more specific object of this invention is to provide a thread cutting screw of the above type with a cutting edge having the starting end portion thereof directed to provide positive feeding of the screw into the work and having the remaining portion of the cutting edge disposed to provide a more efficient cutting action.

Another object of this invention is to provide a thread cutting screw of the above type, wherein the recess is located so that one surface of the recess and the peripheral surface of the screw shank, which surfaces join to form the cutting edge, are disposed at such an angle to each other as will provide a very efficient cutting edge.

Other objects and advantages of the present invention will be apparent from the following description and the drawings, wherein.

Figure 1:
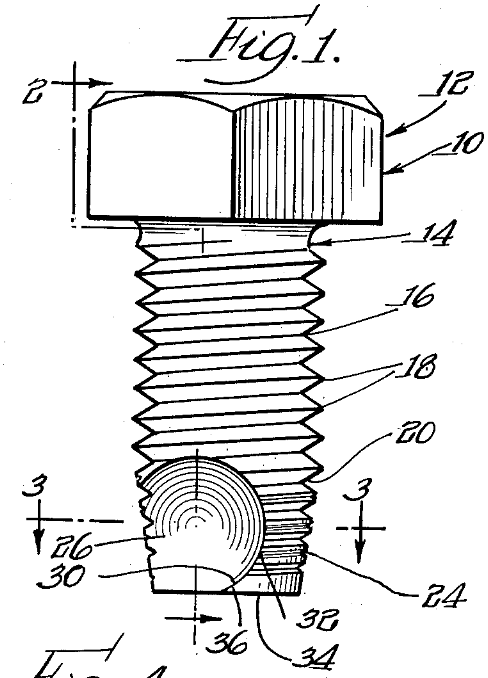
Fig. 1 is a side elevational view of a thread cutting screw, involving the principles of this invention.
Figure 2:
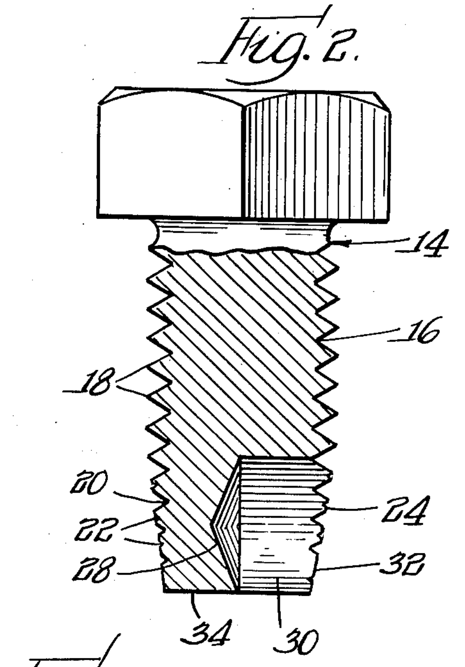
Fig. 2 is a vertical cross section taken along line 2—2 in Fig. 1.
Figure 4:
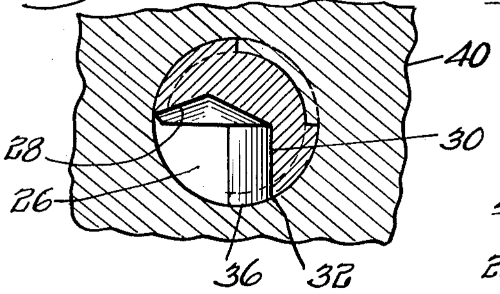
Fig. 4 is a horizontal cross sectional view taken along line 4—4 in Fig. 3.

Referring now more specifically to the drawings, wherein like parts are designated by the same numeral throughout the figures, a thread cutting screw involving the principles of this invention is shown in Fig. 1 and is generally designated by the numeral 10. The screw 10 comprises a head section 12 adapted to receive a tool for application of torque thereto and a shank section 14.

The shank 14 may be conveniently divided into a holding section 16 having screw threads 18 formed thereon and a terminal end portion or work piece entering portion 20 having screw threads 22 formed thereon. As shown in the drawings, the screw threads 22 are formed with progressively decreasing diameters in the direction toward the free end of the shank to provide a tapering work piece entering portion, which may be readily inserted within the aperture of the work piece. Both the threads 18 and 22 are preferably formed by a rolling operation in a well known manner. Since the tapering threads 22 have a diameter less than the threads 18, the threads 22 do not extend to the usual point, but rather they have relatively broad edges which are deformed slightly by the rolling operation to form serrations 24.

Figure 3:
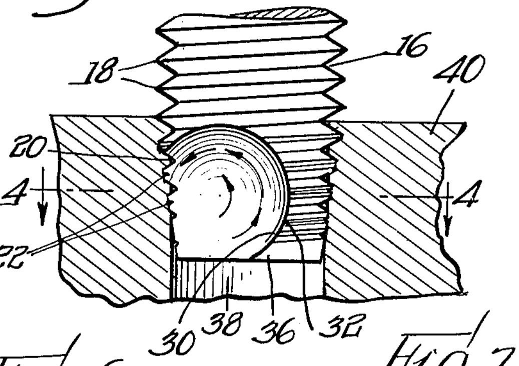
Fig. 3 is a partial side elevational view, showing the improved thread cutting screw started into a work piece.

The work entering portion 20 of the shank is recessed, as at 26, which recess in the embodiment shown in Figs. 1 through 4, inclusive, is formed by drilling. In this embodiment, the recess is defined by a dish-shaped surface 28, which is formed by the point of the drill and a generally circular surface 30. Preferably, the recess is formed so that the surface 30 extends substantially normally to a plane extending through the axis of the screw shank. The junction of the wall or surface 30 with the peripheral surface of the entering portion 20 of the shank forms an arcuate cutting edge 32. The edge 32 is serrated by the threads 24, so that it will cut complementary threads in a work piece when threaded thereinto. As shown best in Figs. 1 and 3, the recess is located so that it opens through the end face 34 of the shank, whereby chips cut from the work piece during the thread cutting action may be discharged from the recess. It should be noted that the outer or initial work piece engaging portions of the cutting edge 32 faces upwardly or toward the head of the screw, whereby a hook portion 36 is formed on the cutting edge. When the screw 10 is threaded into an unthreaded aperture 38 of the work piece 40, as shown in Fig. 3, the upwardly facing hook portion 36 of the cutting edge will undercut the walls of the aperture, thereby positively feeding the screw into the aperture. The remaining portion of the cutting edge 32 faces outwardly away from the screw head, so that the cutting edge is disposed at an angle, which is more efficient for thread cutting purposes. While the hook portion 36 of the cutting edge is disposed at an angle, which is not the best for thread cutting purposes, it is noted that the initial cuts made by the hook portion 36 are relatively small, and, therefore, the cutting efficiency of the hook portion is not appreciably reduced, while the hook portion provides the beneficial result of positively feeding the screw. It should be further noted that the recess is formed so that the wall or surface 30 extends normally to the plane passing through the axis of the screw shank. Furthermore, the wall 30 is located so that the cutting edge 32 is positioned to the right of the center line of the screw shank, as viewed in Fig. 1. By reason of this construction, the wall 30 intersects lines drawn tangent to the peripheral surface of the screw shank at the cutting edge 32 at an angle of about 90° or less. This provides a cutting edge having surfaces disposed at such angles as will provide the most efficient cutting action.

Figure 5:
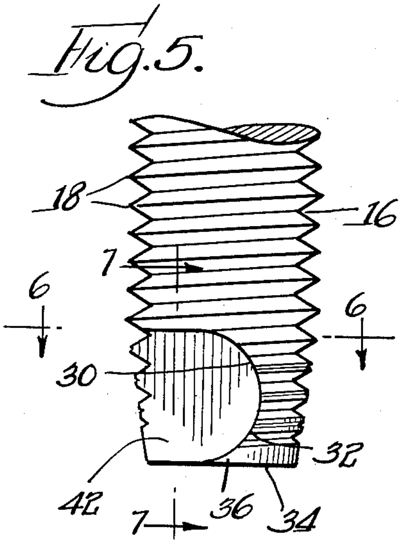
Fig. 5 is a fragmentary side elevational view, showing a slightly modified form of the improved thread cutting screw.
Figure 6:
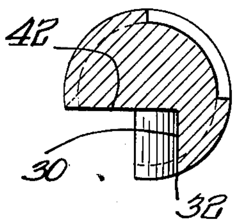
Fig. 6 is a horizontal cross section taken along line 6—6 in Fig. 5.
Figure 7:
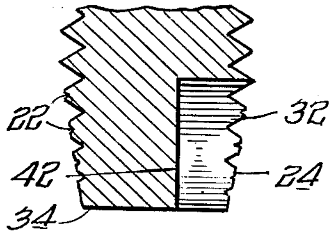
Fig. 7 is a fragmentary vertical cross section taken along line 7—7 in Fig. 5.

The embodiment of the thread cutting screw shown in Figs. 5 through 7 is identical with the form shown in Figs. 1 through 4, except that the recess is formed by means of a grinding wheel or a milling cutter directed inwardly from the left side of the screw shank, as viewed in Fig. 5. Because of this method of forming the recess, the surface 42, which corresponds to the previously described surface 28, is flat instead of dish-shaped.

From the above description, it is clear that when the screw 10 is initially started into the aperture 38 of the work piece 40, the initially entering hook portion 36 of the cutting edge 32 will undercut the surfaces of the aperture and positively feed the screw. As the screw advances, this positive feeding action will continue. Because of the arcuate shape of the cutting edge, the succeeding portions thereof, which make progressively deeper cuts into the work piece, are directed against the work piece at a progressively varying angle for increasing the cutting efficiency. The arcuate configuration of the surface 30 continuously directs the chips cut from the work piece in the direction of the arrows in Fig. 3 away from the cutting edge and finally out of the recess, whereby jamming of the cutting edge is prevented.

From the above description, it is clear that the present invention provides a simple thread cutting screw capable of carrying out the objectives heretofore set forth. More specifically, the particular configuration of the cutting edge to provide the upwardly facing hook portion, which positively feeds the screw and the formation and location of the wall 30, which provides a cutting edge constructed to produce the most efficient cutting action and to discharge the chips, are provided to carry out the above objectives.

While the preferred embodiment has been described and shown herein, it is obvious that many changes may be made in the details of construction of this invention without departing from the spirit and the scope of the appended claims.

I claim:

1. A thread cutting screw comprising a head and a shank, said shank having a threaded holding section and a threaded tapering entering section, said entering section having a recess extending substantially laterally thereinto and opening through the bottom and side thereof, said recess being defined at least in part by a cylindrical surface having an axis lying in a plane offset to one side of the axis of the shank, the radius of said cylindrical surface being less than the distance from its axis to the surface of the shank at the diametricaly opposit side of the shank axis and being greater than the distance its axis is offset from the shank axis and said radius being greater than the vertical distance from its axis to the recess opening through the bottom of the entering section and greater than the horizontal distance from its axis to the recess opening through the side of the entering section, said cylindrical surface intersecting the tapering entering section and defining a cutting edge circular with respect to the aforementioned recess axis, and said recess traversing the entering extremity of the screw substantially half way through the same for removing a substantial portion of the total cross sectional area of the screw to provide ample chip receiving space, the bottom of said recess intersecting said cylindrical surface in a plane substantially normal to the recess axis, said cutting edge presenting an initial work engaging portion facing generally toward said head and another portion facing generally away from said head.

2. A thread cutting screw as claimed in claim 1, wherein the cutting edge of the screw has a circular extent of not less than 90° and not more than 180° of a circle.

3. A thread cutting screw as claimed in claim 1, wherein the axis of the screw shank and the axis of the recess are normal to one another.

4. A thread cutting screw as claimed in claim 1, wherein the circular cutting edge is provided with a plurality of serrated cutting teeth of gradually increasing diameter from the entering end of the screw to the vicinity of the threaded holding section of the screw.

References Cited in the file of this patent

UNITED STATES PATENTS

| | | |
|---|---|---|
| 1,875,362 | Wells | Sept. 6, 1932 |
| 2,165,149 | Olson | July 4, 1939 |
| 2,255,997 | Hanneman | Sept. 16, 1941 |

FOREIGN PATENTS

| | | |
|---|---|---|
| 335,578 | Great Britain | Sept. 26, 1930 |
| 654,626 | Germany | Dec. 24, 1937 |